(12) United States Patent
Carro

(10) Patent No.: US 7,287,164 B2
(45) Date of Patent: Oct. 23, 2007

(54) METHOD AND SYSTEM FOR ENCODING SIGNATURES TO AUTHENTICATE FILES

(75) Inventor: Fernando Incertis Carro, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 765 days.

(21) Appl. No.: 10/659,111

(22) Filed: Sep. 9, 2003

(65) Prior Publication Data

US 2004/0054906 A1 Mar. 18, 2004

(30) Foreign Application Priority Data

Sep. 12, 2002 (EP) .................. 02368100

(51) Int. Cl.
*H04L 9/30* (2006.01)
(52) U.S. Cl. .......................................... 713/176; 726/2
(58) Field of Classification Search ..................... None
See application file for complete search history.

(56) References Cited

U.S. PATENT DOCUMENTS

| 5,958,051 | A | | 9/1999 | Renaud et al. | |
|---|---|---|---|---|---|
| 5,978,791 | A | | 11/1999 | Farber et al. | |
| 6,367,012 | B1 | * | 4/2002 | Atkinson et al. | ........... 713/176 |
| 6,393,468 | B1 | | 5/2002 | McGee | |
| 2002/0174341 | A1 | * | 11/2002 | Logue et al. | ............... 713/179 |

OTHER PUBLICATIONS

UIUC DLI Testbed Processing Customization; http://dli.grainger.uiuc.edu/papers/coletext.htm; 8 pages, Mar. 12, 1996.
Can I support long file names on my Mac?; http://www.zdnet.co.uk/help/tips/story/0,2802,e7107647,00.html; 2 pages, Dec. 21, 2000.
Secure Hash Standard; http://www.itl.nist.gov/flpspubs/flp180-1.htm; 18 pages, Apr. 17, 1995.
Bender, et al.; Techniques for data hiding; IBM Systems Journal, vol. 35, Nos. 3&4; 1996; pp. 313-336, 1996.
Schneier, Bruce; Applied Cryptography, Second Edition, Protocols, Algorithms, and Source Code in C; 15 pages, 1996.

* cited by examiner

*Primary Examiner*—Christopher Revak
*Assistant Examiner*—Saoussen Besrour
(74) *Attorney, Agent, or Firm*—Schmeiser, Olsen & Watts; William H. Steinberg; David R. Irvin

(57) ABSTRACT

Method and system for verifying the authenticity and integrity of files transmitted through a computer network. Authentication information is encoded in the filename of the file. In a preferred embodiment, authentication information is provided by computing a hash value of the file, computing a digital signature of the hash value using a private key, and encoding the digital signature in the filename of the file at a predetermined position or using delimiters, to create a signed filename. Upon reception of a file, the encoded digital signature is extracted from the signed filename. Then, the encoded hash value of the file is recovered using a public key and extracted digital signature, and compared with the hash value computed on the file. If the decoded and computed hash values are identical, the received file is processed as authentic.

4 Claims, 4 Drawing Sheets

METHOD AND SYSTEM FOR ENCODING SIGNATURES TO AUTHENTICATE FILES

FIELD OF THE INVENTION

The present invention relates to network computing security, and more specifically to a method and system for verifying the authenticity and integrity of files accessed and retrieved through a network.

BACKGROUND OF THE INVENTION

A serious risk associated with the exchange of electronic information on open and unsecured networks, particularly on the Internet, concerns the modification of data during transfer. As a consequence, it is important to authenticate files received over a network to verify that they have neither been corrupted nor altered, and that they have not been sent by an impostor.

For example, when a user receives a file attached to an e-mail, such an authentication must be done when clicking on the file attachment icon. The attached files may include computer programs, text documents, graphics, pictures, audio, video, or other information that is suitable for use within a computer system. Likewise, if a document includes a link to an executable file or a software program, the user may wish to ensure that the received file has been sent by a trustworthy party prior to exposing his or her computer system to a program file that might include a "Trojan Horse" or a virus. As a result, the demand for secured transfer increases.

To improve data transmission security over computer networks and prevent digital forgery, a digital signature is commonly used to provide document and signer authentication, i.e. to control the source of a received file, and verify document integrity. Digital signatures are based upon cryptographic algorithms wherein security is provided through one or more keys independently of the algorithm, which may be freely published or analyzed. Two general types of key-based authentication algorithms for authenticating digital documents are well known in the art: symmetric and public-key.

In a symmetric algorithm, the encryption key and the decryption key are the same, and must be kept in secrecy by both parties, the sender and the receiver. The standard solution is to add a Message Authentication Code (MAC) to the transmitted documents. The MAC is computed with a one-way hash function over the document and depends on the secret key known by the sender and the receiver. The MAC allows the receiver to check that the received document has been sent by someone who shares the same secret-key and that the document has not been altered.

For example, the Secure Hash Algorithm (SHA) specified by the National Institute of Standards and Technologies (NIST), FIPS PUB 180-1, "Secure Hash Standard", US Department of Commerce, May 1993, produces a 160-bit hash value. It may be combined with a key, e.g. through the use of a mechanism referred to as Keyed-Hashing for Message Authentication (HMAC), which is the subject of the Request For Comment (RFC) of the Internet Engineering Task Force (IETF) under the number 2104. HMAC is devised so that it can be used with any iterative cryptographic hash function, including SHA. Therefore, a MAC can be appended to the transmitted document so that the whole document can be checked by the receiver.

Public key algorithms, also known as asymmetric algorithms, use two different keys. One key is used for signing, and the other for verification. These algorithms are called "public-key" algorithms because the verification key can be made public. In contrast, the signature key needs to be kept secret by its owner, the signer.

Using digital signatures involves two processes, one performed by the signer to generate the signature and the other by the receiver to verify the signature. The signer creates a digital signature for a particular document by using his or her private key, and transmits both the document and the digital signature to the receiver. The verification process checks the digital signature received with the document using the public verification key. Properties of cryptographic digital signatures are such that they prevent extraction of someone's digital signature from one document and reattachment to another. Likewise, any changes in the signed document are detected, since any change will cause the signature verification process to fail. Furthermore, the signing key cannot be calculated from the verification key in a reasonable time.

In practical implementations, public-key algorithms are generally not used to provide signatures for long documents. To save time, signature protocols like the Rivest-Shamir-Adleman algorithm (RSA) or Digital Signature Algorithm (DSA) are often implemented with secure (one-way) hash functions. Basically, instead of signing a complete document, the signer computes a hash value of the document and signs the computed hash value.

Several signature algorithms are in use today. One popular signature algorithm is a combination of a hashing algorithm and an RSA encryption algorithm, e.g. Message-Digest-5 (MD5) with RSA, and SHA with RSA. Another popular signature algorithm is the DSA encryption algorithm, which may be used for limited purposes as a signature algorithm by private parties. *Applied Cryptography*, Second Edition, 1996, by Bruce Schneier, which is available from John Wiley & Sons, Inc., New York City, N.Y., presents a detailed description of signature and hashing algorithms and related encryption operations.

Once the digital signature of a file has been computed, it must be associated with the signed file. Digital signatures authenticating a file can be appended to the file they authenticate, e.g. as part of a file wrapper structure, embedded within the file or transmitted as separate files. Each of these methods has advantages and drawbacks.

Wrapping a file with delimiters and appending the digital signature at the end of the file is convenient, since both the signature and content travel together. Algorithms to sign and check signatures are simple and efficient. Conversely, the wrapper and signature will typically need to be removed before the file can be used. Thus, signature validation only occurs when the document is retrieved. If the document is later passed on or moved, it may be difficult to check again. Furthermore, the method is not compatible with standard file formats such as image, video, audio or executable files that cannot be recognized prior to authentication.

Embedding digital signatures into files has received considerable attention to protect copyrights attached to digital multimedia materials that can be easily copied and distributed through the Internet and through networks in general. A review of data embedding and data hiding techniques is described in "Techniques for data hiding" by W. Bender, et al., *IBM Systems Journal*, Vol. 35, Nos. 3&4, 1996. The most common form of high bit-rate encoding on images, as reported by Bender, is the replacement of the least significant luminance bits of image data with the embedded data so that the alteration of the image is imperceptible. This method is used for watermarking or tamper-proofing to detect image alterations. However a first drawback lies in the lack of standardization of how and where to integrate signatures into the different file formats, particularly on image, video, audio or executable files, and the added complexity of authenticating algorithms. Another important drawback is that merging the checking information and the file content affects the readability and quality of documents, e.g. digital images.

Maintaining signatures and data in separate files, e.g. signature files that may be stored on a server, has the advantage of supporting file authentication at any time in a simple and well understood way. However, the signature can be lost, accidentally removed, or intentionally removed in an attempt to cheat.

A more complex situation arises when authentication concerns a group of files, e.g. a document including attachments or links to other files. To deal with these frequent cases, a standard solution is to aggregate the files and generate a single MAC by applying a cryptographic hashing algorithm to the aggregation. But such a solution has a significant drawback, since the receiver must authenticate all the files that are aggregated, which is time consuming. To remedy this problem, other methods provide a separate signature file or MAC file along with the group of files. This MAC file includes individual check-values for the files, e.g. hash-values, as well as a digital signature or a MAC value for the group of files. Check-values of the signature file are compared with the corresponding values computed from the received files, and the digital signature of the group of files is verified. A classical method for generating a separate signature file for groups of data files is described in U.S. Pat. No. 5,958,051, "Implementing digital signatures for data streams and data archives," to Renaud, et al. However, the method of using a separate signature file has several drawbacks as described above. Furthermore, if a file linked to the group has been withdrawn or is no longer accessible, none of the files of the group may be authenticated.

Therefore, there is a need for an efficient method and system for securing and verifying the authenticity and integrity of all types of files so as to remedy the shortcomings discussed above.

SUMMARY

An object of the invention is to provide a method and system to authenticate all types of files and groups of files without appending or embedding digital signatures in the authenticated files.

Another object of the invention to provide a method and system to authenticate all types of files and groups of files without encoding digital signatures on separate files.

The accomplishment of these and other related objects is achieved by a computer file containing digital data wherein authentication information is encoded in the filename of the computer file at a predetermined position, or using delimiters.

The invention includes a method for encoding authentication information in the filename of a computer file containing digital data. The method comprises the steps of: computing a hash value of the computer file; computing a digital signature of the computed hash value using a private key of the sender; and encoding the computed digital signature in the filename of the computer file at a predetermined position, or using delimiters.

The invention also includes a method for authenticating a computer file having a filename comprising authentication information. The method for authenticating comprises the steps of: extracting authentication information from the filename of the computer file; recovering the encoded hash value of the computer file by using the public-key of the sender and the extracted authentication information; computing the hash value of the computer file using the same hash function used for authentication information encoding; comparing the encoded and the computed hash values; and, if the encoded and the computed hash values are identical, processing the computer file, else, if the encoded and the computed hash values are different, rejecting the computer file.

DETAILED DESCRIPTION

The invention encodes a certification or digital signature of a file into a portion of its filename. Since filenames can be freely formed by generic alphanumeric strings on all operating systems, independently of the file type, format, and content, files authenticated in this way may be of any form, including document files, source program files, text files, executable files, audio files, image files, video files, and the like.

Different types of file systems are available for different operating systems. Each file system type has its own format and characteristics such as maximum filename length, maximum file size, and so on. These maximums are generally large enough to accommodate encoding the corresponding signatures or MACs into the filenames. For example, the MAC of a file can be computed by means of a secret key using the HMAC (Keyed-Hashing for Message Authentication) method with the SHA (Secure Hash Algorithm) hashing method, producing a 160-bit keyed hash string. This MAC can be encoded in the filename of the authenticated file as a string of 40 hexadecimals. The signature may be appended to the filename to form a signed filename.

Figure 1:
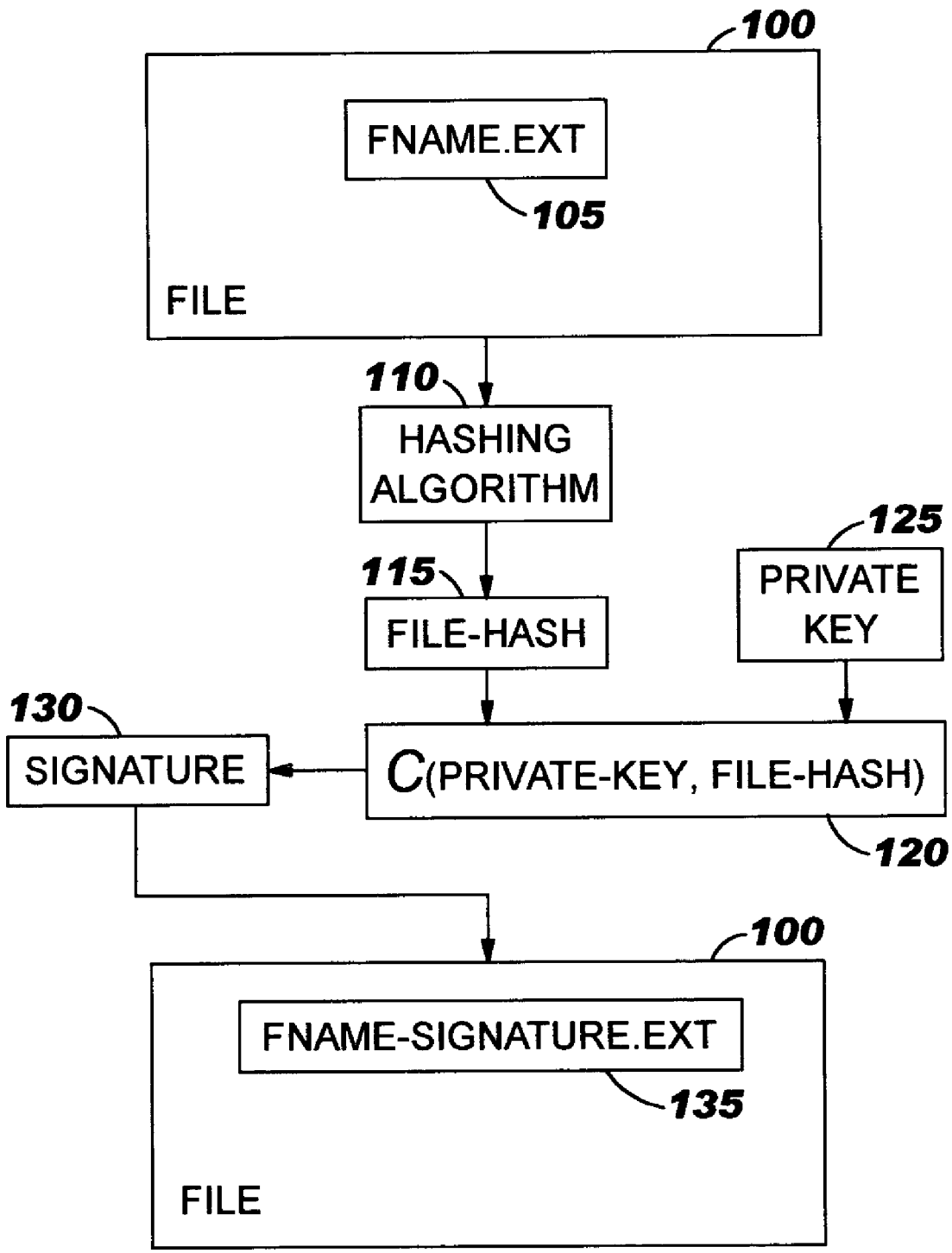
FIG. 1 illustrates a method according to the invention for generating a signed filename.

FIG. 1 illustrates an embodiment of the invention for encoding authentication information of a file 100, which file is named FNAME.EXT 105. In the exemplary embodiment illustrated by the figure, the signature of the file 100 is computed using a combination of a hashing algorithm 110 to obtain a hash value 115 and an RSA encryption algorithm 120 such as MD5 with RSA, or SHA with RSA, that uses the computed hash value and a private key 125. Then, by encoding the computed signature 130 in the filename 105 of the file 100, e.g. by appending it to the original filename before the file extension .EXT, a signed filename 135 is generated which contains the signature 130 of the authenticated file 100.

The authentication encoding method of this example comprises the steps of: computing a hash value FILE-HASH 115 of the file 100 using hash function 110; computing a digital signature 130 of the file hash value 115 using private-key 125 of the sender; encoding the computed digital signature 130 in the filename 105 of the file 100 at a predefined position, or using delimiters, to create signed filename 135; and transmitting the authenticated file 100 using the signed filename 135.

Since the signature of the file is encoded in the filename, rather than in the file body, the original (non authenticated) file and the authenticated file are identical, both having exactly the same format and content.

In a preferred embodiment, the digital signature has a predetermined size, and is added to the filename just before the file extension.

Figure 2:
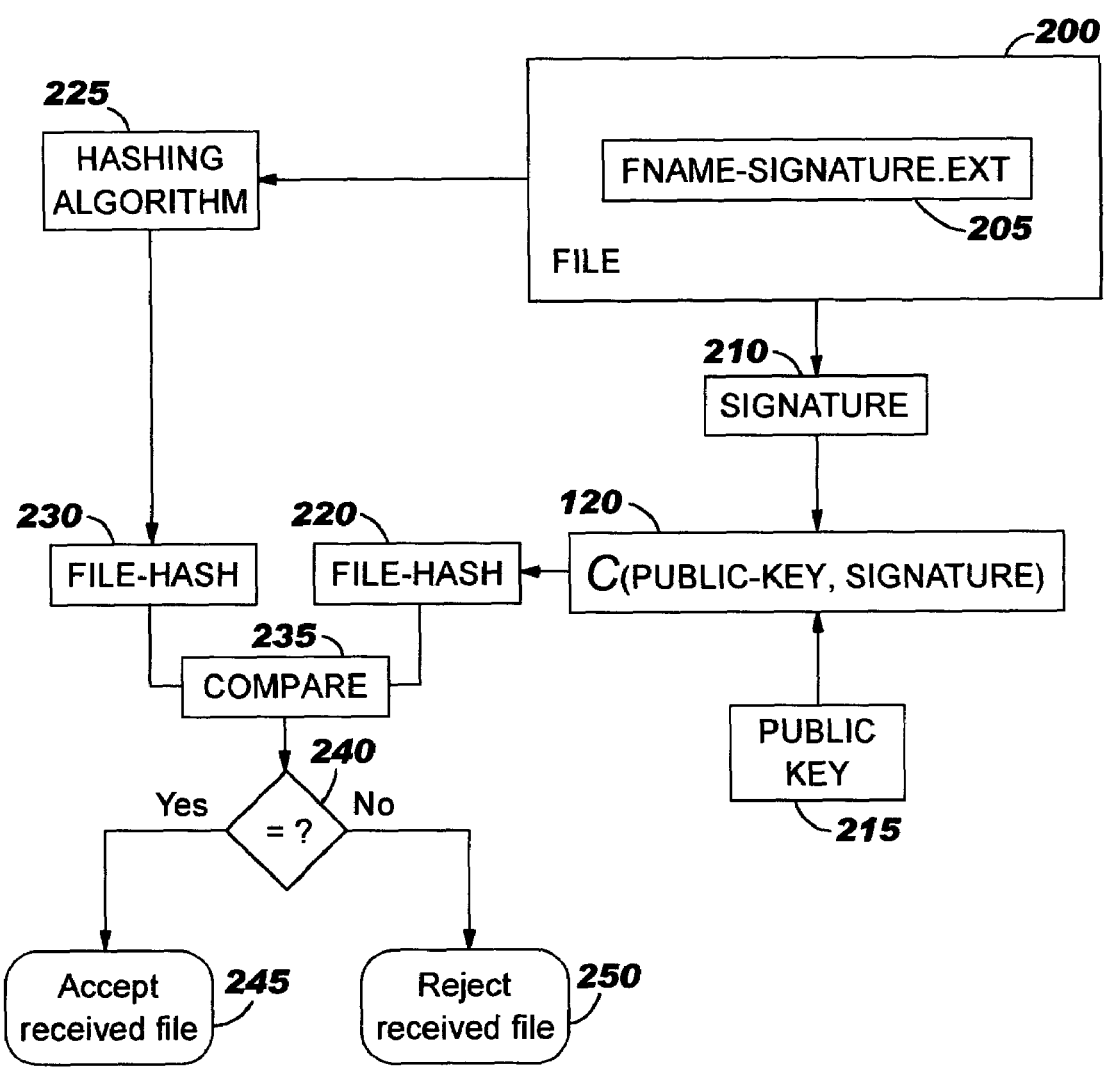
FIG. 2 describes a method according to the invention for verifying the authenticity and integrity of a received file using a digital signature extracted from the signed filename.

FIG. 2 illustrates an embodiment of the invention for verifying the authenticity and integrity of a received file 200 that comprises authentication information provided according to the inventive procedure described above with reference to FIG. 1, i.e. by encoding the digital signature of the file 200 into the filename 205. The verification method of this example comprises the steps of: extracting the encoded digital signature 210 from the signed filename 205 of received file 200; recovering the encoded hash value FILE-HASH* 220 of the received file 200 using the public-key 215 of the sender and the encryption algorithm 120 associated with the corresponding private-key 125, and extracted signature 210; computing the hash value FILE-HASH 230 of received file 200 using hash function 225, which is the same hash function 110 used by the sender to compute digital signature 130; comparing the computed hash value FILE-HASH 230 with the decoded hash value FILE-HASH* 220; and, if the computed hash value FILE-HASH 230 and the decoded hash value FILE-HASH* 220 are identical 240, processing the received file 200 as an authentic file 245, else, if the computed hash value FILE-HASH 230 and the decoded hash value FILE-HASH* 220 are different 240, rejecting the received file 200 as being fake or corrupted 250.

Figure 3:
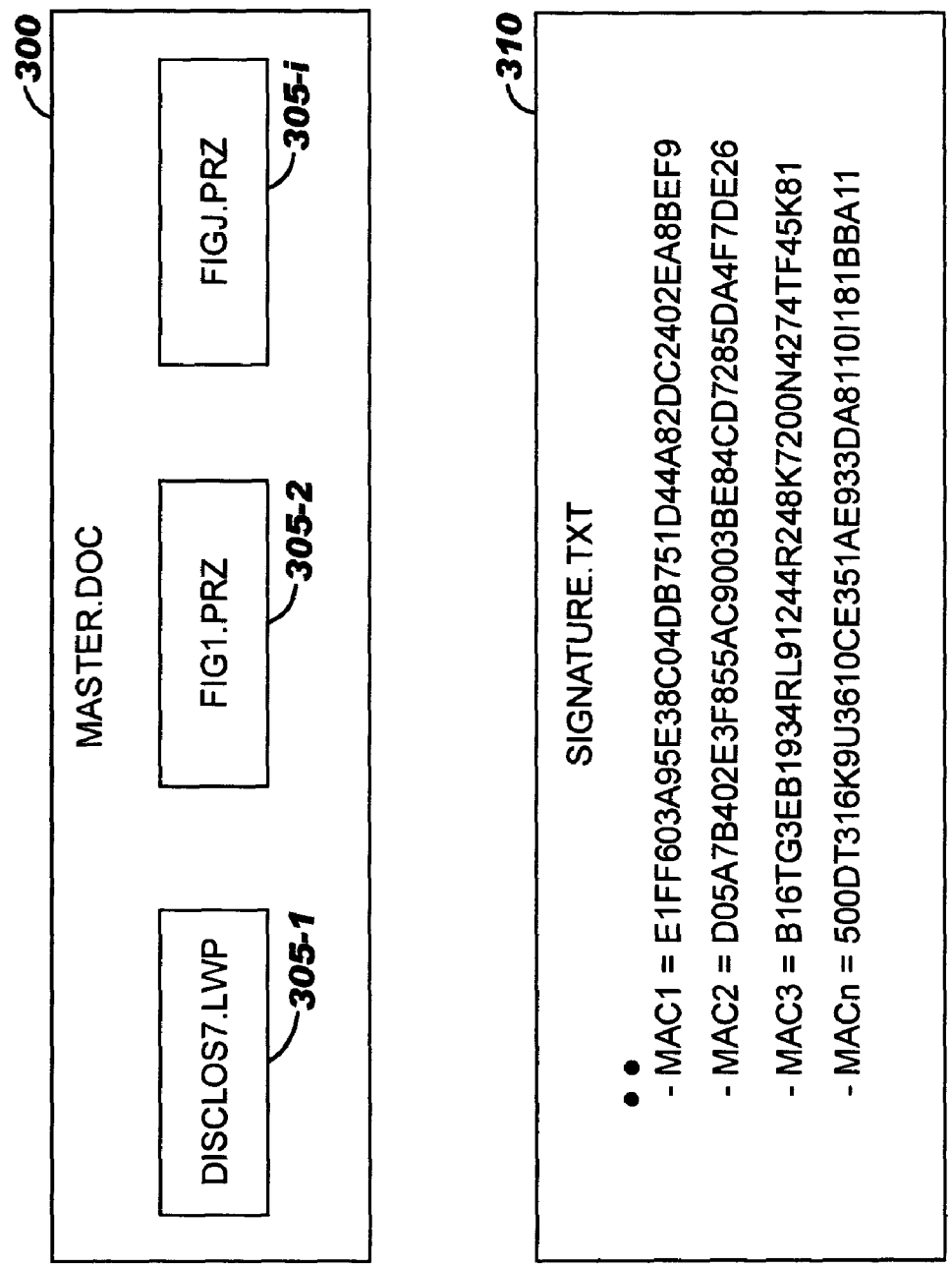
FIG. 3 illustrates an example from the prior art where the integrity information of a group of files, formed by an electronic document that includes a plurality of file attachments, is encoded on a separate signature file.

FIG. 3 shows an example from the prior art where the integrity information of a group of files, formed in this case by a master electronic document 300 referred to as MASTER.DOC that includes a plurality of files, attachments, and/or links, in particular DISCLOS7.LWP, FIG 1.PRZ and FIG J.PRZ, referred to as 305-1, 305-2 and 305-i, respectively, is encoded in a separate signature file 310 named SIGNATURE.TXT. This signature file includes individual check-values for all the attached or linked files, e.g. MAC2 and MAC3, as well as a digital signature or a MAC value for the group of files, e.g. MAC1.

Figure 4:
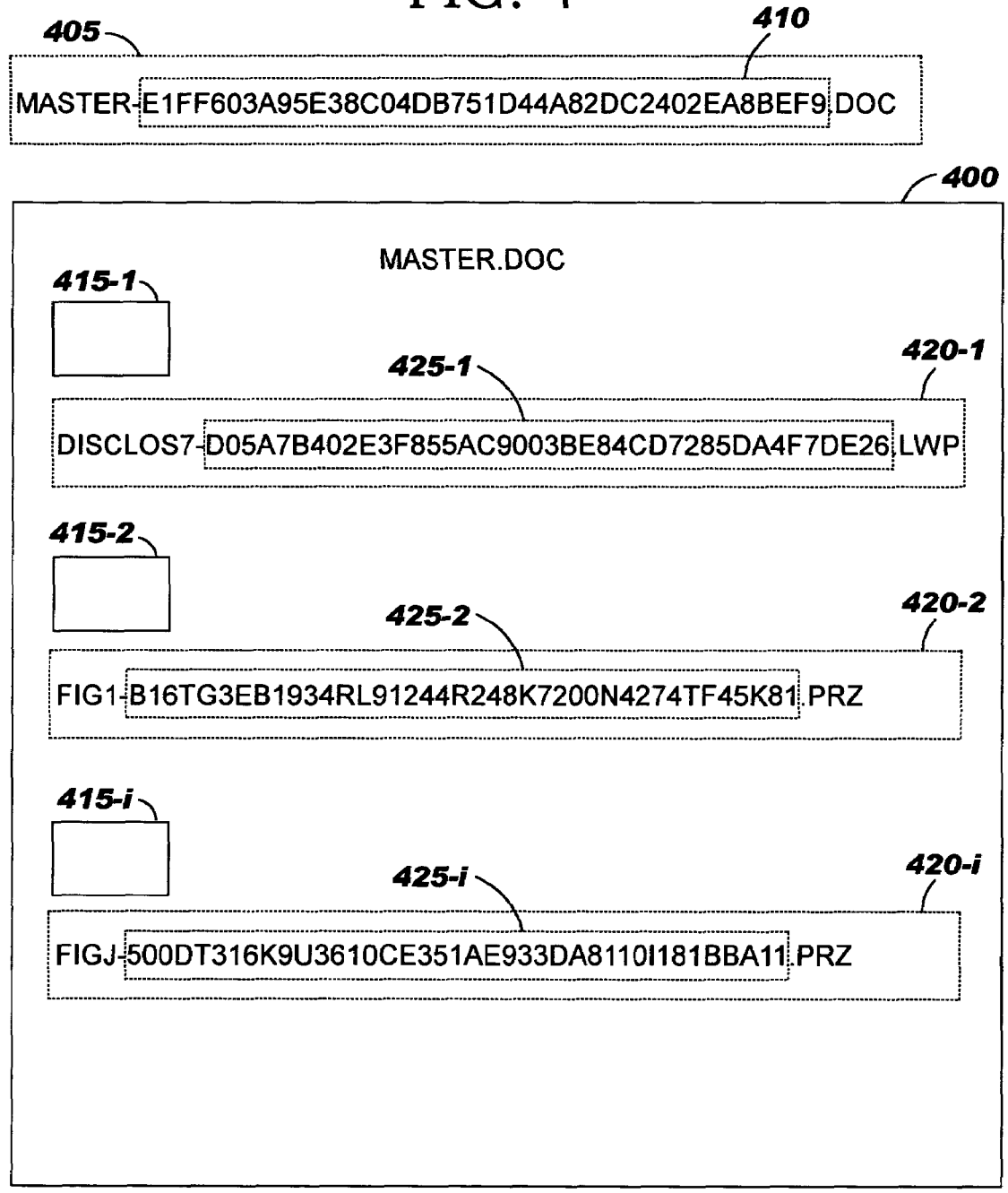
FIG. 4 illustrates encoding and verification of signatures or the MAC of a master file and attached or linked files using digital signatures extracted from the corresponding signed filenames.

In contrast to the prior art of FIG. 3, the present invention enables checking information to be associated with each attachment or hyperlink object rather than with the document that contains the attachment and/or hyperlinked objects. FIG. 4, which illustrates an exemplary embodiment of the invention, shows a master file 400 and its associated signed filename 405 comprising the signature or MAC 410 of this master file without taking attached or linked files into account. In this example, three files named DISCLOS7.LWP, FIG 1.PRZ, and FIG J.PRZ, referred to as 415-1, 415-2 and 415-j, respectively, are attached or linked to master file 400. Each attached or linked file, generically referred to as 415, is associated with a signed filename, generically referred to as 420, comprising the file name and the corresponding digital signature or MAC value, generically referred to as 425.

For sake of illustration, suppose that the hexadecimal string 410 "E1FF603A95E38C04DB751D44A82DC2402EA8BEF9" is the MAC of master file 400 with signed filename 405 MASTER-E1FF603A95E38C04DB751D44A82DC2402EA8BEF9.DOC, while the hexadecimal string 425-1 "D05A7B402E3F855AC9003BE84CD7285DA4F7DE26" corresponds to the MAC of attached file 415-1, having the signed filename 420-1 DISCLOS7-D05A7B402E3F855AC9003BE84CD7285DA4F7DE26.PRZ.

MAC values are computed, for example, using a secret key and the HMAC (Keyed-Hashing for Message Authentication) method with the SHA (Secure Hash Algorithm) hashing method, that produces a 160-bit (40 hex length) hash value. In the example illustrated by FIG. 4, digital signatures have a fixed size and are located just before the file extension so that they may be extracted easily.

Thus, for the master file, the method for encoding authentication information comprises the steps of: computing a hash value of the file 400 using a hash function; computing a digital signature 410 of the computed file hash value using the private key of the sender; and encoding the computed digital signature 410 in the filename of the file 400 at a predefined position, or using delimiters, to create the signed filename 405. For each file attached or linked to the master file, the steps include: computing a hash value of the file 415 using the hash function; computing a digital signature 425 of the computed file hash value using the private key of the sender; encoding the computed digital signature 425 in the filename of the file 425 at a predefined position, or using delimiters, to create the signed filename 420; and transmitting the authenticated master file 400 using the signed filename 405 and the attached files or links 415 and the associated signed filenames 420.

Upon reception of a master file 400 having a signed filename 405 and attached files or links 415 with associated signed filenames 420, the method for accessing the documents comprises the steps of: analyzing the master file; extracting the encoded digital signature 410 from the signed filename 405 of the received master file 400, at a predefined position or using delimiters; recovering the encoded hash value of the received master file 400 using the public key of the sender and the extracted digital signature 410; computing the hash value of the received master file 400 using the same hash function used by the sender to compute the digital signature 410; comparing the computed and decoded hash values; and, if the computed and decoded hash values are identical, processing the received master file 400 as an authentic file, else, if the computed and decoded hash values are different, rejecting the received master file 400 as being fake or corrupted.

Upon selection of an attached or linked file, the method for accessing the documents comprises the steps of: extracting the encoded digital signature 425 from the signed filename 420 of the selected attached or linked file 415, at a predefined position or using delimiters; recovering the encoded hash value of the selected attached or linked file 415 by using the public key of the sender and the extracted digital signature 425; computing the hash value of the selected attached or linked file 415 using the same hash function used by the sender to compute the digital signature 425; comparing the computed and decoded hash values; and, if the computed and decoded hash value are identical, processing the selected attached or linked file 415 as an authentic file, else, if the computed and decoded hash values are different, rejecting the selected attached or linked file 415 as being fake or corrupted.

Since the method as described above is adapted for accessing an attached or linked file without analyzing other attached or linked files, it allows such attached or linked files to be forwarded independently, keeping the sender authentication information.

Naturally, in order to satisfy local and specific requirements, a person skilled in the art may apply many modifications and alterations to the solution described above, all of which, however, are included within the scope of protection of the invention as defined by the following claims.

I claim:

1. A method for encoding authentication information in the filenames of computer files containing digital data, said method comprising the steps of:

provisioning a master computer file, a first computer file, and a second computer file, wherein the master computer file has an original filename structured as $FNAME_0.EXT_0$ such that $FNAME_0$ denotes an alphanumeric name portion of the original filename of the master computer file and $EXT_0$ denotes an alphanumeric file extension portion of the original filename of the master computer file, wherein the first computer file has an original filename structured as $FNAME_1.EXT_1$ such that $FNAME_1$ denotes an alphanumeric name portion of the original filename of the first computer file and $EXT_1$ denotes an alphanumeric file extension portion of the original filename of the first computer file, and wherein the second computer file has an original filename structured as $FNAME_2.EXT_2$ such that $FNAME_2$ denotes an alphanumeric name portion of the original filename of the second computer file and $EXT_2$ denotes an alphanumeric file extension portion of the original filename of the second computer file;

generating a signed filename of the master computer file by performing the steps of:

computing a hash value $H_0$ of only the digital data comprised by the master computer file, computing a digital signature of the hash value $H_0$ using a private key of a sender, generating the signed filename of the master computer file by encoding the computed digital signature of the hash value $H_0$ in the original filename of the master computer file such that the signed filename of the master computer file comprises the computed digital signature of the hash value $H_0$ disposed between $FNAME_0$ and $EXT_0$, and associating the signed filename of the master computer file with the master computer file;

generating a signed filename of the first computer file by performing the steps of:

computing a hash value $H_1$ of only the digital data comprised by the first computer file, computing a digital signature of the hash value $H_1$ using the private key of a sender, generating the signed filename of the first computer file by encoding the computed digital signature of the hash value $H_1$ in the original filename of the first computer file such that the signed filename of the first computer file comprises the computed digital signature of the hash value $H_1$ disposed between $FNAME_1$ and $EXT_1$, and associating the signed filename of the first computer file with the first computer file;

generating a signed filename of the second computer file by performing the steps of:

computing a hash value $H_2$ of only the digital data comprised by the second computer file, computing a digital signature of the hash value $H_2$ using the private key of a sender, generating the signed filename of the second computer file by encoding the computed digital signature of the hash value $H_2$ in the original filename of the second computer file such that the signed filename of the second computer file comprises the computed digital signature of the hash value $H_2$ disposed between $FNAME_2$ and $EXT_2$, and associating the signed filename of the second computer file with the second computer file; and generating a composite computer file by attaching to the master computer file the first computer file and its associated signed filename and by attaching to the master computer file the second computer file and its associated signed filename.

2. The method of claim 1, wherein said steps of computing the hash values $H_0$, $H_1$ and $H_2$ use a Secure Hash Algorithm or a Message-Digest-5 algorithm.

3. The method of claim 1, wherein the master computer file is an electronic mail (e-mail).

4. The method of claim 1, said method further comprising sending, by the sender to a receiver, the composite computer file.

* * * * *